«12» United States Patent
Matsudaira et al.

(10) Patent No.: US 7,470,213 B2
(45) Date of Patent: Dec. 30, 2008

(54) AUTOMATIC TRANSMISSION CONTROL DEVICE

(75) Inventors: Naotada Matsudaira, Wako (JP); Soya Uchida, Wako (JP); Go Morita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 323 days.

(21) Appl. No.: 11/533,099

(22) Filed: Sep. 19, 2006

(65) Prior Publication Data

US 2007/0066444 A1 Mar. 22, 2007

(30) Foreign Application Priority Data

Sep. 22, 2005 (JP) ............................. 2005-276538

(51) Int. Cl.
*B60W 10/06* (2006.01)
*B60W 10/10* (2006.01)
(52) U.S. Cl. ..................... 477/120; 477/43; 477/904
(58) Field of Classification Search ............. 477/904
See application file for complete search history.

(56) References Cited

U.S. PATENT DOCUMENTS 5,016,495 A 5/1991 Takizawa et al.
5,136,897 A * 8/1992 Boardman ............... 477/84
5,605,519 A 2/1997 Seidel et al.
6,033,338 A 3/2000 Jackson et al.
6,360,155 B1 3/2002 Taffin et al.
6,530,291 B1 3/2003 Shimoda et al.
6,896,640 B2 * 5/2005 Kurabayashi ............ 477/46

FOREIGN PATENT DOCUMENTS

JP 09-42433 A 2/1997

OTHER PUBLICATIONS

European Search Report, dated Sep. 18, 2006, issued in corresponding European Application No. 06 01 6111.

* cited by examiner

*Primary Examiner*—Sherry L Estremsky
*Assistant Examiner*—Edwin A Young
(74) *Attorney, Agent, or Firm*—Westerman, Hattori, Daniels & Adrian, LLP.

(57) ABSTRACT

An automatic transmission control device of a vehicle performs a gear change operation based on a deceleration of the vehicle. The automatic transmission control device detects the deceleration of the vehicle and an engine rotational speed. The device also stores a peak value of the engine rotation speed during a period in which a vehicle travels with one predetermined gear step, and includes a relationship map showing the relationship between the deceleration and a shift-down rotational speed. The device performs an automatic shift-down when the engine rotational speed is lowered from the peak value by a predetermined rotational speed which is obtained from the map based on the deceleration.

8 Claims, 8 Drawing Sheets deceleration -shift-down ΔNe table

AUTOMATIC TRANSMISSION CONTROL DEVICE

TECHNICAL FIELD

The present invention relates to an automatic transmission control device, and more particularly to an automatic transmission control device which can obtain proper shift-down timing by accounting for deceleration and engine rotational speed.

BACKGROUND OF THE INVENTION

A conventional automatic transmission for a vehicle is known that induces a gear change rotational speed from a predetermined map based on a vehicle speed and a throttle opening and automatically performs a gear change operation based on the gear change rotational speed. There has also been known a transmission control device which, when it is determined that the deceleration of a vehicle body exceeds a predetermined value using a deceleration brake which is mounted on a wheel or the like, performs the shift-down to a gear change step which can obtain larger engine brake irrespective of the above-mentioned predetermined map.

For example, JP-A-9-42433 1 discloses such a transmission control device which changes a predetermined value of the deceleration which becomes a criterion for determining whether the shift-down is performed or not based on a vehicle speed. According to this transmission control device, for example, by setting the predetermined value of the deceleration, which is applied to the traveling at 80 km/h, larger than the predetermined value which is applied to the traveling at 50 km/h, the shift-down is not performed unless the larger deceleration is generated when the vehicle body is decelerated from the traveling at 80 km/h, thus preventing the generation of a large transmission shock attributed to the shift-down from the high-speed traveling.

SUMMARY OF THE INVENTION

However, in the technique disclosed in JP-A-9-42433 1, the shift-down is performed only based on the deceleration corresponding to the vehicle speed and hence, when the engine rotational speed is gradually and largely decreased in a state that the deceleration is small, the shift-down is not performed and the shift-down assumes a negative value at the time of reacceleration or the like. Accordingly, there has been a drawback that further improvements are necessary.

It is an object of the present invention to provide an automatic transmission control device which overcomes the above-mentioned drawback of the conventional art and obtains proper shift-down timing by taking the deceleration and an engine rotational speed into consideration.

According to one aspect of the present invention, an automatic transmission control device is provided which performs a gear change operation based on deceleration of a vehicle body, wherein the automatic transmission control device includes a deceleration detecting means which detects the deceleration, an engine rotational speed detecting means which detects an engine rotational speed, a peak value storing means which stores a peak value of the engine rotational speed during a period in which a vehicle travels with one predetermined gear step, a map which shows the relationship between the deceleration and a shift-down rotational speed, and a means which performs a shift-down when the engine rotational speed is lowered from the peak value by a predetermined rotational speed which is obtained from the map based on the deceleration.

According to another aspect of the present invention, the means which performs the shift-down also performs the shift-down toward a low speed side by one step when the engine rotational speed is lowered from the peak value by the predetermined rotational speed.

According to another aspect of the present invention, the predetermined rotational speed is set to a smaller value corresponding to the increase of the deceleration.

According to another aspect of the present invention, the means which performs the shift-down also operates a timer which restricts the shift-down for a predetermined period when the engine rotational speed is lowered from the peak value by the predetermined rotational speed, and performs the shift-down at a point of time that the timer finishes.

According to another aspect of the present invention, the automatic transmission control device is used for a motorcycle.

Thus, it is possible to perform the shift-down at proper timing by taking not only the deceleration but also the engine rotational speed into consideration thus enhancing the drivability.

Thus, by performing the shift-down step by step, a load attributed to an excessive engine brake force can be reduced thus suppressing a discomfort in manipulation feeling which a rider feels.

Thus, the larger the deceleration becomes, the shift-down is performed with the engine rotational speed having a small lowering width from the peak value. Therefore, it is possible to quickly perform the shift-down while maintaining the high engine rotational speed and hence, even when the reacceleration is immediately performed after the rapid deceleration, it is possible to prevent the occurrence of a state that the engine rotational speed is excessively lowered so that a sufficient acceleration force cannot be obtained.

Thus, it is possible to prevent a phenomenon that the shift-down is continuously performed at the time of rapid deceleration thus increasing a transmission shock or the like.

Thus, it is possible to smoothly perform the shift-down in a motorcycle which is light in weight and is liable to be easily influenced by an engine brake and hence, it is possible to obtain the automatic transmission control device which can provide favorable riding feeling to a rider

BRIEF DESCRIPTION OF THE DRAWINGS

The preferred embodiments of the present invention are shown by way of example, and not limitation, in the accompanying figures, in which.

DETAILED DESCRIPTION OF THE INVENTION

In the following paragraphs, some embodiments of the invention will be described by way of example and not limitation. It should be understood based on this disclosure that various other modifications can be made by those in the art based on these illustrated embodiments.

Figure 1:
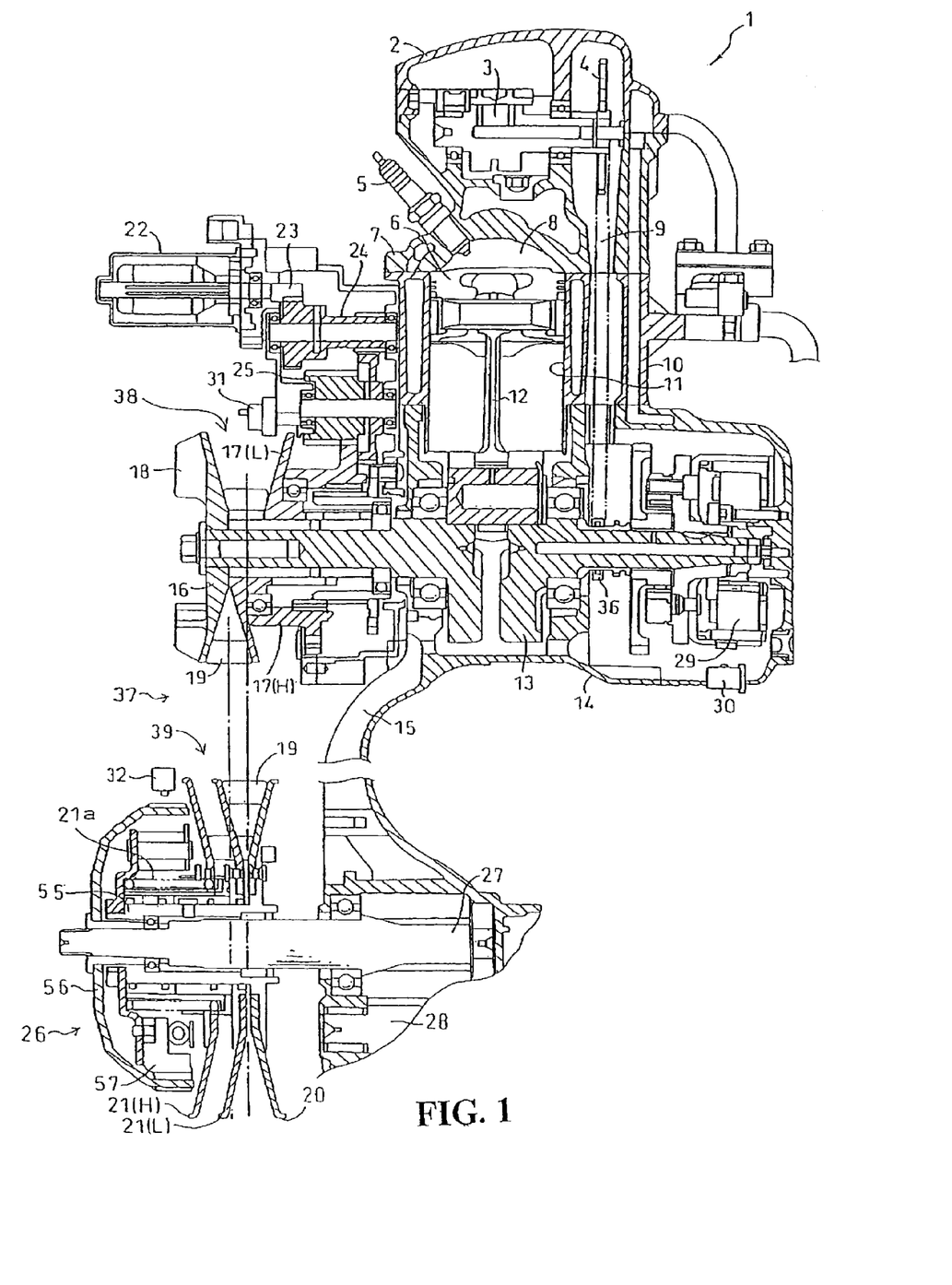
FIG. 1 is a cross-sectional view of a power unit of a motorcycle according to one embodiment of the present invention.

FIG. 1 shows a cross-sectional view of a power unit of a scooter-type motorcycle, which adopts an automatic transmission control device according to an embodiment of the present invention. A unit-swing type power unit 1 which is integrally constituted of an engine and a continuously variable transmission which transmits a driving force of the engine to a driving wheel at a proper gear ratio is, assuming the lateral direction in the drawing as the vehicle width direction, connected to a pivot portion arranged on a rear portion of the scooter-type motorcycle in a rockable manner. A piston 6 is connected to a crankshaft 13 which constitutes an output shaft of the engine by way of a connecting rod 12, and the piston 6 is slidably arranged in the inside of a cylinder 11 which is mounted in a cylinder block 10. A cylinder head 7 is attached to an upper end of the cylinder block 10, and a combustion chamber 8 in which an air-fuel mixture is burned is formed of the cylinder head 7, the cylinder 11 and the piston 6.

A valve (not shown in the drawing) which controls an intake and an exhaust of the air-fuel mixture to and from the combustion chamber and an ignition plug 5 which ignites the compressed air-fuel mixture are arranged in the cylinder head 7. An open/close operation of the valve is controlled by the rotation of a cam shaft 3, which is pivotally supported on the cylinder head 7. A driven sprocket wheel 4 is provided to a right end portion of the cam shaft 3, above which a cylinder head cover 2 is arranged, and an endless cam chain 9 or belt is extended between and is wound around the driven sprocket wheel 4 and a drive sprocket wheel 36 which is mounted on the crankshaft 13.

A motor, e.g., ACG starter motor 29, which is fixed to a right end portion of the crankshaft 13, is accommodated in a right end portion of the crank case 14 which pivotally supports the crankshaft 13. In the vicinity of the ACG starter motor 29, a Ne sensor 30, which constitutes an engine rotational speed detection means for detecting a rotational speed of the engine based on a rotational speed of the ACG starter motor 29, is provided. On one hand, a continuously variable transmission 37 which is constituted of, for example, a drive-side pulley 38, a V belt 19 and a driven-side pulley 39 is connected to a left side of the crankshaft 13 in the drawing. Here, a fan 18 which is rotated in synchronism with the crankshaft 13 and forcibly cools the continuously variable transmission 37 and the like is formed on the drive-side pulley 38. The continuously variable transmission 37 is a continuously variable-transmission belt converter which is constituted by extending the endless-type V belt 19 between the drive-side pulley 38 which is connected to a left end portion of the crankshaft 13 and a driven-side pulley 39 which is mounted on a drive shaft 27 which is pivotally supported on a transmission case 15 and is arranged in parallel to the crankshaft 13 by way of a start clutch 26. The continuously variable transmission 37 according to this embodiment includes for example, a gear ratio control motor 22 for arbitrarily changing a gear ratio in the vicinity of the drive-side pulley 38.

The drive-side pulley 38 includes a drive-side fixed pulley half body 16 which is attached to a left end portion of the crankshaft 13 and a drive-side movable pulley half body 17 which is slidably mounted on the crankshaft 13 in the axial direction of the crank shaft 13. In the drawing, the drive-side movable pulley half body 17 is provided with a feed screw on a right side thereof. By rotating the drive-side movable pulley half body 17 with a driving force of the gear ratio control motor 22 which is transmitted by way of a pinion gear 23, a first transmission gear 24 and a second transmission gear 25, the drive-side movable pulley half body 17 is slidably movable in the axial direction of the crankshaft 13. Here, in the vicinity of the drive-side movable pulley half body 17, a gear ratio sensor 31 which can detect a gear ratio by detecting a position of the drive-side movable pulley half body 17 is provided.

The driven-side pulley 39 includes, for example, a driven-side fixed pulley half body 20 which is fixed to a sleeve 55 integrally rotated with a rotor which supports a clutch shoe 57 of the start clutch 26 and a driven-side movable pulley half body 21 which is slidably movable in the axial direction of the sleeve 55. Further, the V belt 19 is extended between and is wound around substantially V-shaped cross-section belt grooves which are respectively formed between the drive-side fixed pulley half body 16 and the drive-side movable pulley half body 17 and between the driven-side fixed pulley half body 20 and the driven-side movable pulley half body 21. Further, on a back side of the driven-side movable pulley half body 21, a spring 21a which biases the driven-side movable pulley half body 21 toward the driven-side fixed pulley half body 20 is provided.

When a rotational speed of the driven-side pulley 39 does not reach a predetermined value, he start clutch 26 interrupts the transmission of a driving force between the driven-side pulley 39 and the drive shaft 27. Then, when the rotational speed of the engine is increased and the rotational speed of the driven-side pulley 39 becomes the predetermined value or more, the clutch shoe 57 pushes an inner peripheral surface of an outer case 56 by a centrifugal force. Accordingly, the rotation of the driven-side pulley 39 is transmitted to the outer case 56 by way of the sleeve 55 and the clutch shoe 57 and hence, the drive shaft 27, which is fixed to the outer case 56, a power transmitting shaft 28, which is meshed with the drive shaft 27, and an axle (not shown in the drawing) of a drive wheel, which is meshed with the transmitting shaft 28 are rotated. Here, in the vicinity of the outer case 56, a vehicle speed sensor 32, which detects a vehicle speed based on the rotational speed of the outer case 56, is provided.

The shift of the gear ratio of the continuously variable transmission 37 is performed by rotatably driving the gear ratio control motor 22 in the direction corresponding to up/down shifting of the gear ratio. When the rotational direction of the gear ratio control motor 22 is directed in the shift-up direction (top ratio direction), the drive-side movable pulley half body 17 is allowed to slide, e.g. in the left direction in the drawing. Then, when the drive-side movable pulley half body 17 approaches the drive-side fixed pulley half body 16 by an amount corresponding to the sliding of the drive-side movable pulley half body 17, the belt groove width of the drive-side pulley 38 is decreased. Accordingly, a contact position between the drive-side pulley 38 and the V belt 19 is shifted in the radially outward direction and hence, a wrapping diameter of the V belt 19 is increased (in the drawing, a low ratio position 17 (L) shown above the crankshaft 13 and a top ratio position (H) shown below the crankshaft 13).

Along with the above-mentioned gear change operation, in the driven-side pulley 39, a distance between the crankshaft 13 and the drive shaft 27 is unchanged and the V belt 19 is an endless belt and hence, a force which tends to reduce the wrapping diameter acts. Accordingly, the driven-side movable pulley half body 21 slides, e.g. in the leftward direction in the drawing, against a resilient force which a spring 21a biases, and a groove width which is defined by the driven-side fixed pulley half body 20 and the driven-side movable pulley half body 21 is increased. In this manner, the change of the gear ratio of the continuously variable transmission 37 is realized, for example, by continuously changing the wrapping diameter (power transmission pitch diameter) of the V belt 19.

As described above, the continuously variable transmission 37, according to this embodiment, can steplessly select an arbitrary gear ratio by controlling the gear ratio control motor 22. Accordingly, depending on the manner of controlling the gear ratio control motor 22, by setting a plurality of fixed gear ratios (for example, 7 steps), it is possible to perform a manual-transmission gear change control in which a rider can carry out the shift change between fixed gear ratios as well as a gear change control which allows the rider to obtain the riding feeling such as a manual-auto-shifting motorcycle in which an automatic gear change is performed in a stepped transmission.

Figure 2:
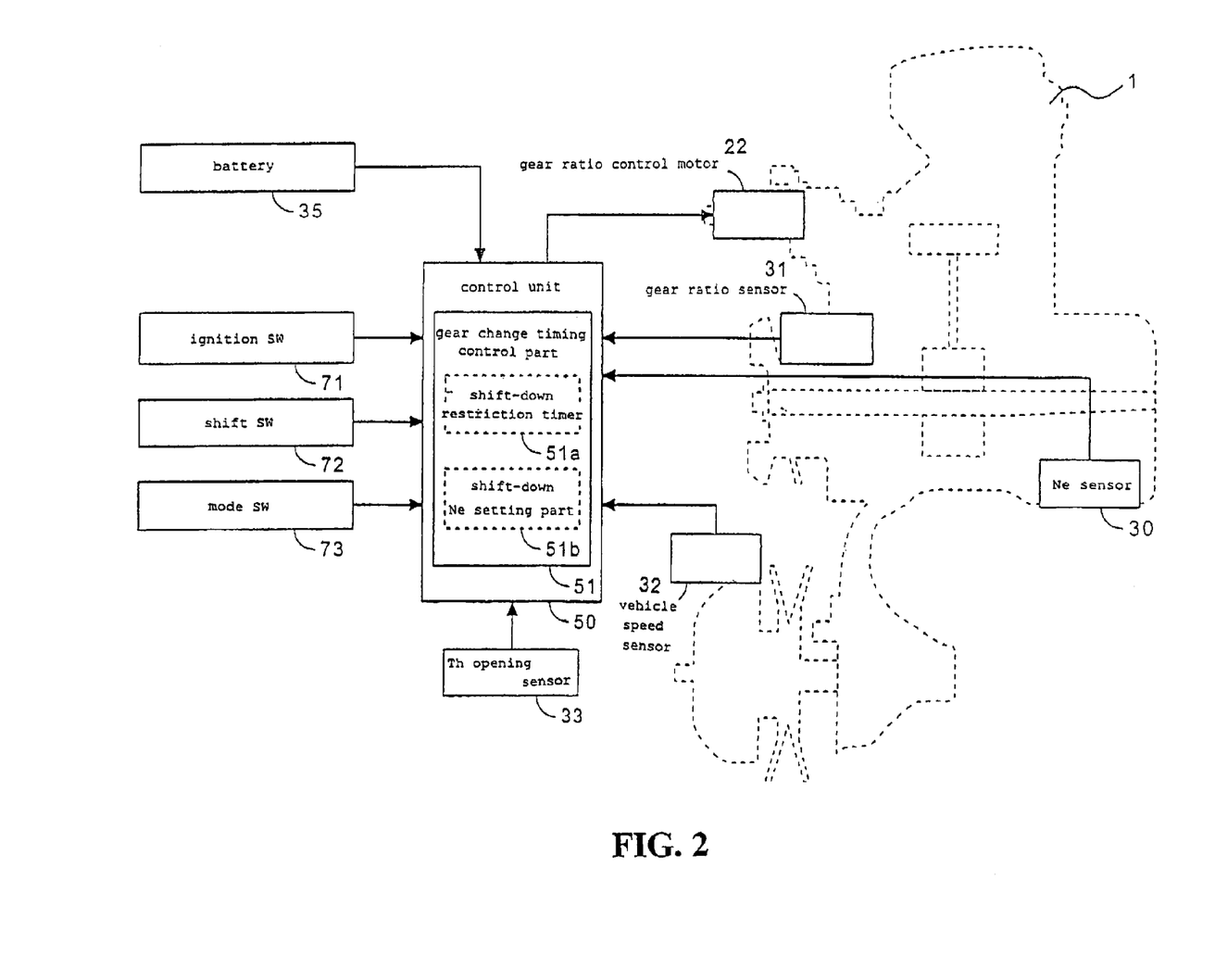
FIG. 2 is a block diagram showing the constitution of an automatic transmission control device according to one embodiment of the present invention.

FIG. 2 is a block diagram showing the constitution of the automatic transmission control device according to an embodiment of the present invention. The battery 35 which is mounted on the motorcycle, for example, supplies electricity or power to a control unit 50 which is mounted on an arbitrary portion of the motorcycle and the gear ratio control motor 22. The power which drives the gear ratio control motor 22 is controlled and supplied by the control unit 50. When an ignition SW 71 which constitutes a main switch is turned on, the control unit 50 is started. The control unit 50 provides command signals to the gear ratio control motor 22 based on information supplied from the gear ratio sensor 31, the Ne sensor 30, the vehicle speed sensor 32 and a Th opening sensor 33 which detects an opening of a throttle valve (not shown in the drawing) which are arranged in the power unit 1. In the inside of the control unit 50, a gear change timing control part 51, which includes a shift-down restriction timer 51a and a shift-down Ne setting part 51b, is provided. Here, contents of the command signals are also changed corresponding to a manipulation state of a shift SW 72 which constitutes a switch for manually performing the shift change, and a mode SW 73 which changes over a gear change mode of the automatic transmission device. Details of the shift change and the gear change modes in this embodiment are described later.

Figure 3:
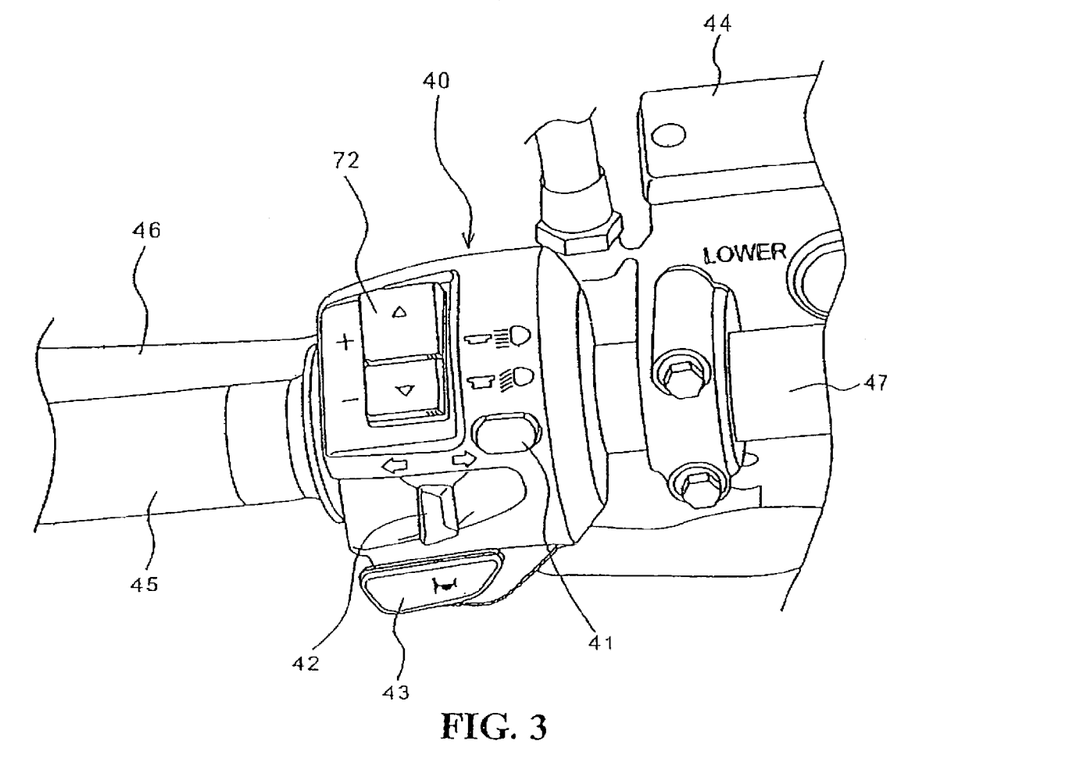
FIG. 3 is a perspective view of a left-side handle switch which is applied to the motorcycle according to one embodiment of the present invention.

FIG. 3 is a perspective view of a left handle switch which is adopted by the motorcycle according to this embodiment of the present invention. On a left portion of a pipe-like handle 47 in the drawing, a left handle grip 45 is mounted, while in front of the handle 47 in the longitudinal direction of the vehicle, a left brake lever 46 is arranged. Further, between the left handle grip 45 and a brake fluid reservoir tank 44, a left switch case 40 is arranged. On the left switch case 40, a blinker switch 42, a horn switch 43, an optical axis selector switch 41 of a head light, and the shift SW 72 which rocks in the plus direction (+) and minus direction (−) are mounted.

Figure 4:
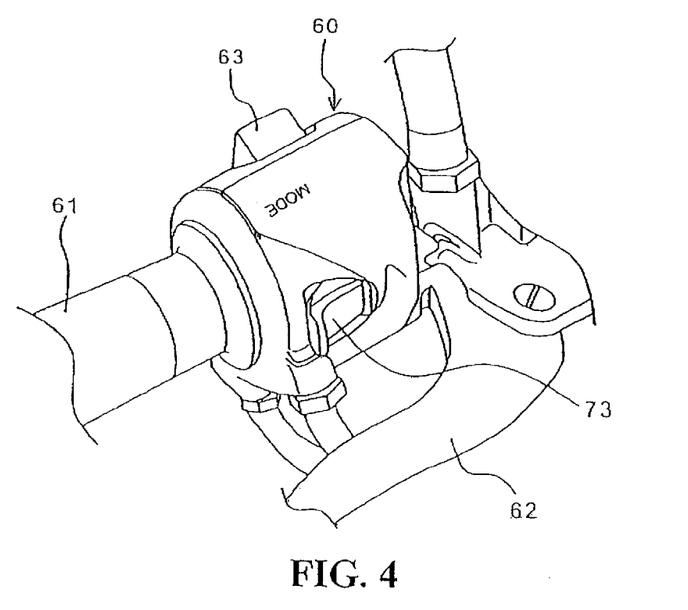
FIG. 4 is a perspective view of a right-side handle switch which is applied to the motorcycle according to one embodiment of the present invention.

FIG. 4 is a perspective view of a right handle switch which is adopted by the motorcycle according to this embodiment of the present invention. In FIG. 4, a state as viewed from a front side of the vehicle is shown. On the right handle, which may be integrally formed with the handle 47, a right handle grip 61 is mounted, and a right switch case 60 is arranged in the vicinity of a right brake lever 62. On the right-side switch case 60, a kill switch 63 (which stops the engine in an emergency), and a mode SW 73 which is manipulated by a forefinger of rider's right hand are provided.

Figure 5:
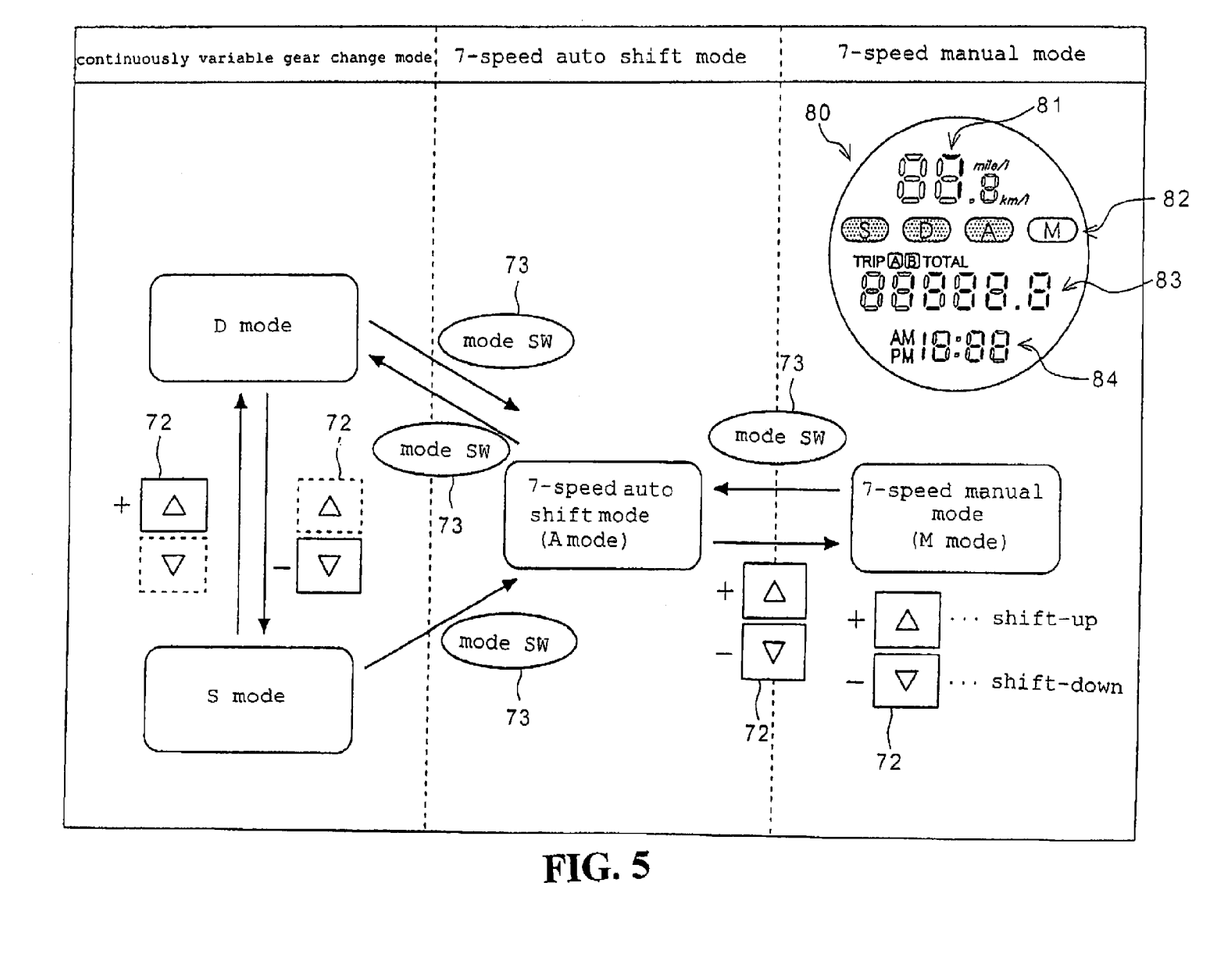
FIG. 5 is a schematic explanatory view of a gear change mode switching of the automatic transmission control device according to one embodiment of the present invention.

FIG. 5 is a schematic explanatory view of a gear change mode switching of the transmission control device according to one embodiment of the present invention. As described above, in this embodiment, a "continuously variable gear change mode" in which a mode is selected from two kinds of modes consisting of a D mode which emphasizes a fuel consumption performance and an S mode which emphasizes an accelerating performance, a "7-gear manual transmission mode" in which the gear ratio is changed over an arbitrarily set seven gear steps by a rider's instruction and a "7-gear automatic shift mode" which provides the riding feeling as if the automatic transmission is performed using the 7-steps transmission are prepared. With respect to a switching manipulation of the respective gear change modes, the switching between the D mode and the S mode is performed using the shift SW 72. When the mode SW 73 is pushed from the D mode or the S mode state, it is possible to change over the mode to the 7-gear automatic shift mode (A mode). Further, when one of "up" or "down" of the shift SW 72 is pushed in the A mode state, the A mode is changed over to the 7-gear manual shift mode (M mode). In the M mode, the 7-step gear change manipulation can be performed arbitrarily using the shift SW 72. Further, when the mode SW 73 is pushed from the M mode, the M mode is changed over to the A mode. Further, when the mode SW 73 is pushed, the A mode is changed over to the D mode.

To allow the rider to confirm the switching states of the respective gear change modes, for example, the switching state is displayed in a display part 80 which is arranged on the inside of a meter panel. In the display part 80, a gear change mode indicator 82, which indicates, for example, the switching state of the respective gear change modes based on lightning of a lamp, is arranged, for example, above a clock display portion 84 and a trip meter 83. Further, above the gear change mode indicator 82, a shift indicator 81, which displays the present gear step change in the M mode or in the A mode is arranged. The shift indicator 81 is also used as a fuel consumption meter which indicates fuel consumption in a predetermined section.

Figure 6:
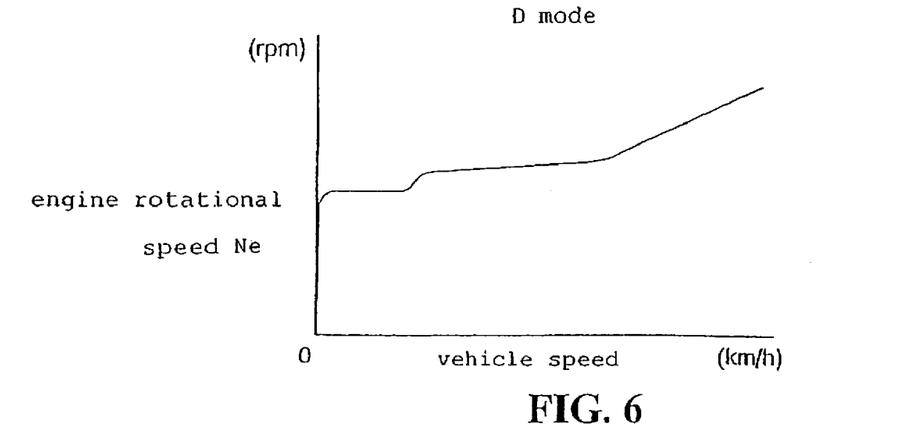
FIG. 6 is a transmission characteristic graph in a D mode of the automatic transmission control device according to one embodiment of the present invention.
Figure 7:
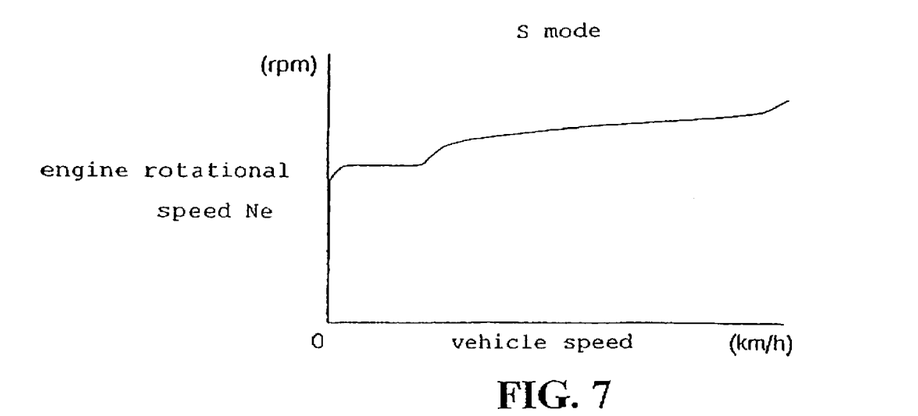
FIG. 7 is a transmission characteristic graph in an S mode of the automatic transmission control device according to one embodiment of the present invention.
Figure 8:
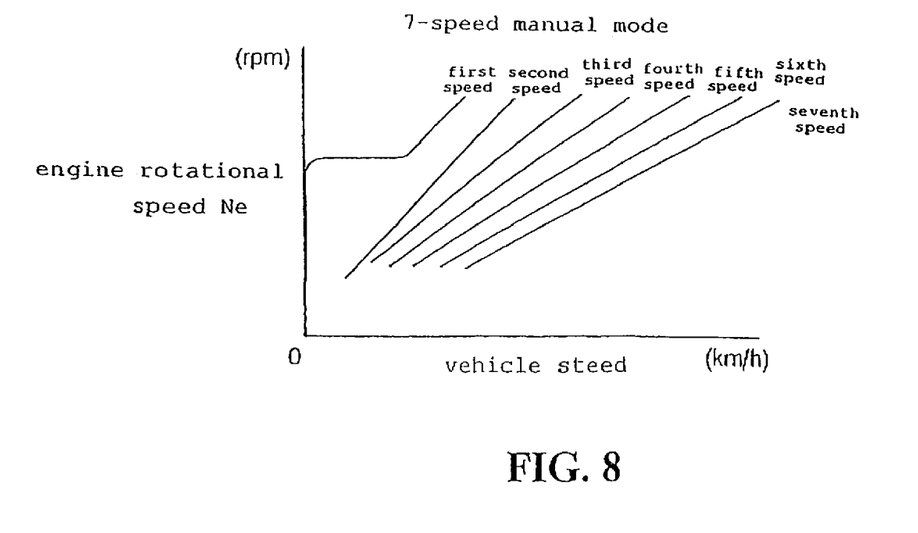
FIG. 8 is a transmission characteristic graph in an M mode of the automatic transmission control device according to one embodiment of the present invention.

FIGS. 6-8 depict example of transmission characteristic graphs in the above-mentioned D mode, S mode and M mode, respectively. The D mode (FIG. 6) shifts a gear ratio in the top ratio direction in a state that the engine rotational speed is relatively low by taking the fuel consumption performance into consideration. The S mode (FIG. 7) (e.g., which requires sharp traveling) sets the gear ratio such that the engine rotational speed Ne is held at a high state as a whole. In the M mode (FIG. 8), fixed gear ratios are set in the same manner as the usual stepped transmission. In the above-mentioned 7-step auto shift mode (A mode), between fixed gear ratios which are applied to the M mode, the gear ratio is set such that the shift change is automatically performed.

Here, inventors of the present invention focus on the shift-down control when the deceleration is performed with a deceleration brake during traveling in the above-mentioned A mode. Irrespective of the map of the gear change timing at the time of usual traveling, in the conventional automatic transmission control device which determines the timing of the shift-down based on the deceleration and the vehicle speed, the engine rotational speed is not taken into consideration. Accordingly, there exist possibilities which adversely affect the riding feeling including a possibility that when the deceleration is large, the engine rotational speed is increased after the shift-down so that a gear-change "shock" is increased. To overcome this drawback, the automatic transmission control device of this embodiment is characterized in that the shift-down can be performed at proper timing by taking a value of the engine rotational speed which performs the shift-down into consideration in addition to the deceleration. Next, the shift-down timing determination control which is applied to the automatic transmission control device according to one embodiment of the present invention is explained in detail in conjunction with the flow chart shown in FIG. 9.

Figure 9:
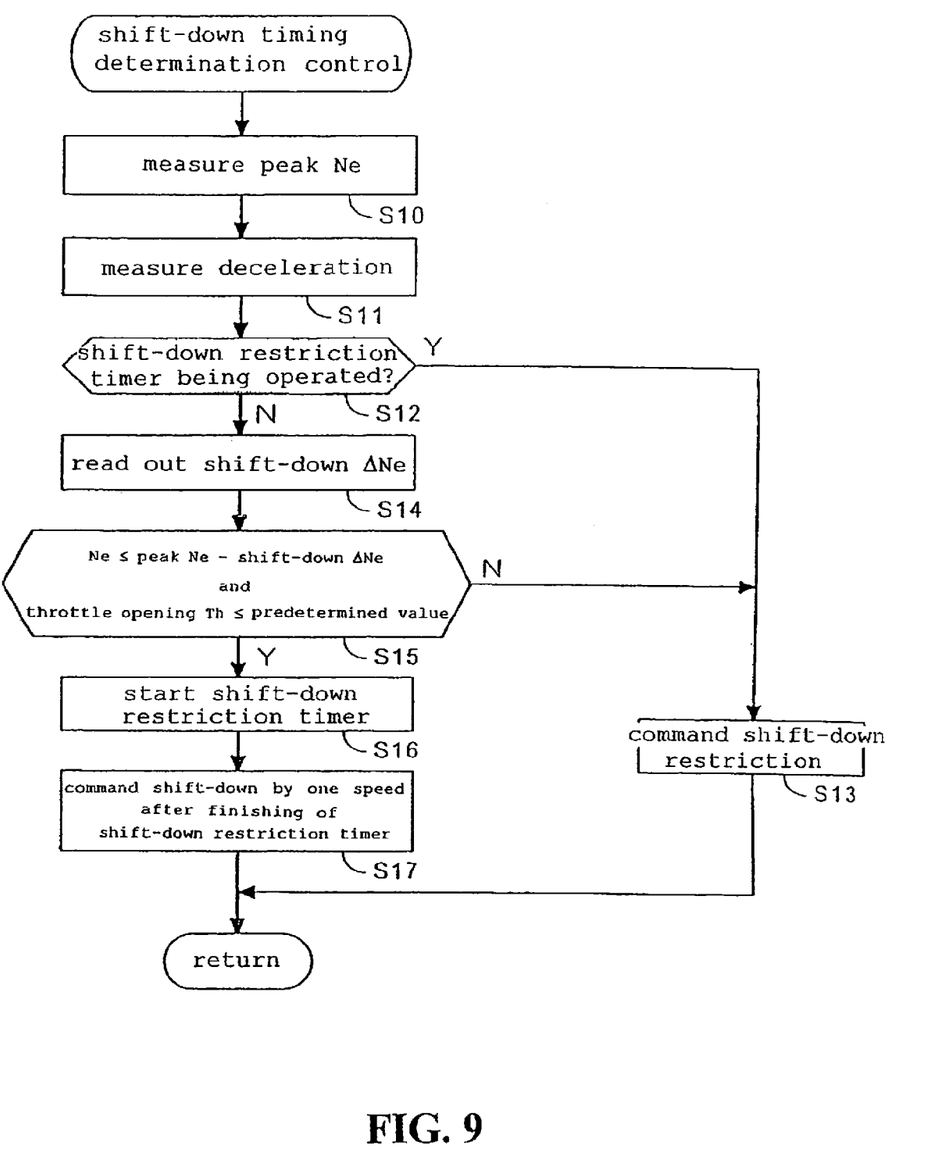
FIG. 9 is a flow chart showing steps of a shift-down determination control according to one embodiment of the present invention.

FIG. 9 is a flow chart showing steps of the shift-down timing determination control according to one embodiment of the present invention wherein a control unit 50 applies to the gear ratio control motor 22 shown in FIG. 2. The flow chart is repeatedly executed at a predetermined cycle. First of all, in step S11, a peak Ne is measured. The peak Ne as a peak value is the maximum engine rotational speed which is recorded in the gear step during a period from the changeover to the present gear step to a point of time of measurement. The peak Ne is induced by arithmetic processing which is executed inside of a gear change timing control part 51 based on information from the Ne sensor 30 and the gear ratio sensor 31, and is stored in a shift-down Ne setting part 51b which constitutes a peak value storing means. Further, leveling processing is applied to an output value from the Ne sensor 30 for avoiding the influence of external noises.

In step S11, the deceleration of the motorcycle is measured based on the information from the vehicle speed sensor 32 which constitutes the deceleration detecting means. Next in step S12, it is determined whether the shift-down restriction timer 51a is being operated or not. When it is determined that the shift-down restriction timer 51a is being operated in step S12, the processing advances to step S13 and a shift-down restriction command is executed. The manner of operation of the shift-down restriction timer 51a is explained later.

Figure 10:
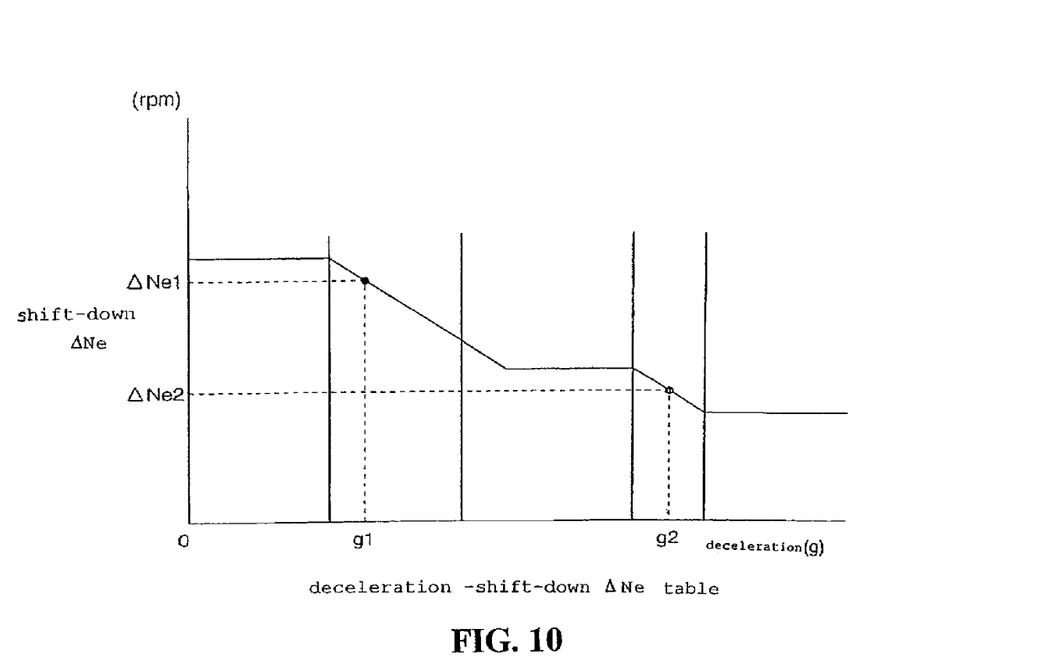
FIG. 10 is a data table showing the relationship between the deceleration and a shift-down ΔNe.

Next, in step S14, the shift-down ΔNe is read out. The shift-down ΔNe is a numerical value which is induced from a deceleration-shift-down ΔNe table which is accommodated in the shift-down Ne setting part 51b. As shown by an example in FIG. 10, the shift-down ΔNe is determined such that the larger the deceleration at the time of measurement, the shift-down ΔNe becomes smaller. Furthermore, as shown the FIG. 10 example, ΔNe2 (which is a value of the shift-down ΔNe when the vehicle speed is decelerated at the deceleration g2) is smaller than ΔNe1 (which is a value of the shift-down ΔNe when the vehicle speed is decelerated at the deceleration g1.)

In step S15, it is determined whether the present engine rotational speed Ne assumes a value which is obtained by subtracting the shift-down ΔNe from the peak Ne or less or not and, at the same time, whether the throttle opening Th assumes a predetermined value or less or not. Here, in conjunction with FIG. 11, the detail of the determination in step S15 is explained. First of all, the peak Ne during traveling at a certain gear step is always measured and updated. Then, when the deceleration starts, the shift-down ΔNe which corresponds to the deceleration is induced and hence, the shift-down executed Ne is calculated using a calculation formula (peak Ne—shift-down ΔNe). In the example shown in the drawing, since the deceleration is g1, ΔNe1 is induced as the shift-down ΔNe. As described above, the determination in step S15 is the determination whether the present engine rotational speed Ne becomes a value equal to or less than the shift-down executed Ne or not and, at the same time, whether throttle opening becomes a value equal to or less than the predetermined value or not. Accordingly, the larger the deceleration of the vehicle, the value of the shift-down ΔNe becomes smaller and, corresponding to the decrease of the shift-down ΔNe, the engine rotational speed Ne (the shift-down executed Ne) on which the gear change timing control part 51 executes the shift-down is increased.

Figure 11:
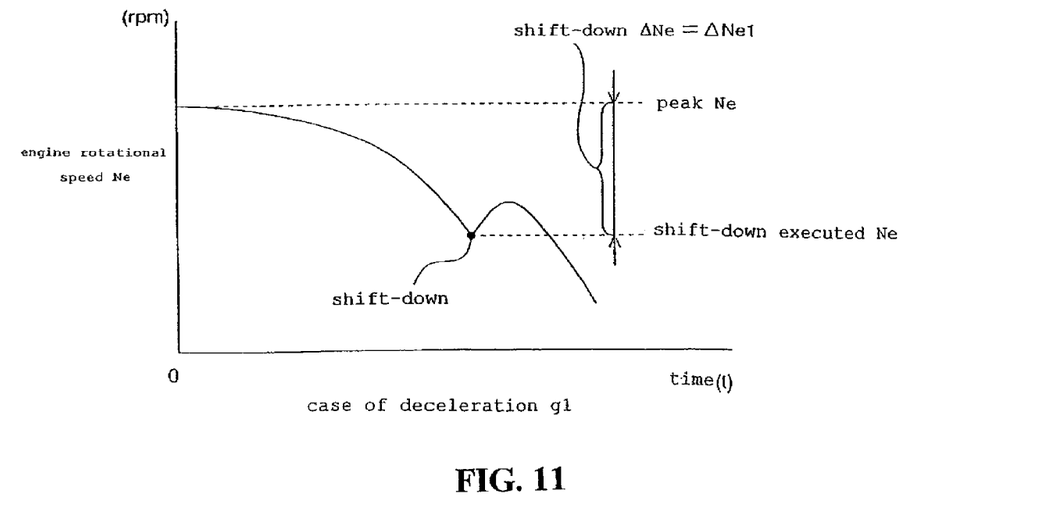
FIG. 11 is a graph showing one example of the relationship between an engine rotational speed and a shift-down period at the time of deceleration.
Figure 12:
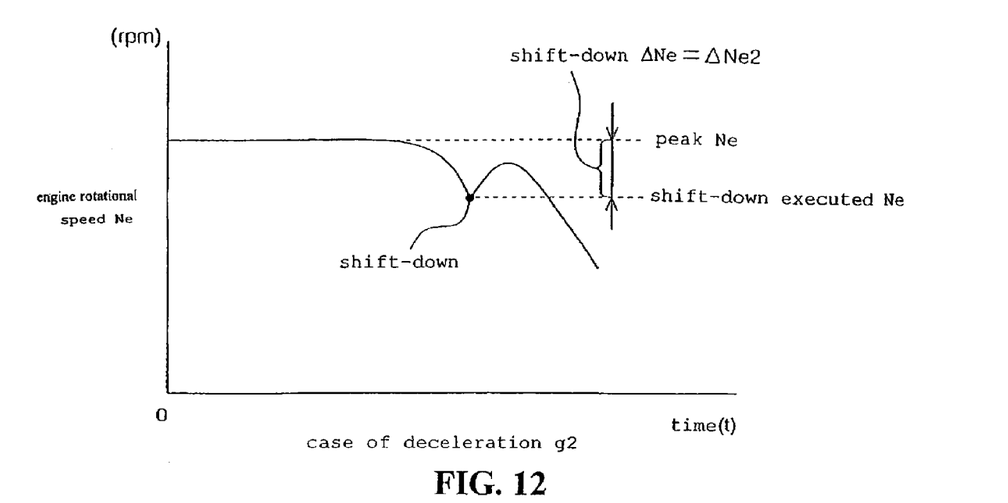
FIG. 12 is a graph showing one example of the relationship between the engine rotational speed and the shift-down period at the time of deceleration.

FIG. 12 is a schematic view of the shift-down operation when the deceleration of the vehicle is larger than the deceleration of the vehicle in the example shown in FIG. 11. In the example shown in the drawing, the shift-down ΔNe is ΔNe2 which is induced from g2 which is larger than g1. As shown in this drawing, the shift-down is performed at a point of time that the lowering width (ΔNe) from the peak Ne is small, that is, with the shift-down executed Ne in a state that the engine rotational speed is relatively high. Accordingly, at the time of rapid deceleration, the shift-down is quickly performed while maintaining the high engine rotational speed and hence, even when the reacceleration is performed immediately after the rapid deceleration, it is possible to prevent a phenomenon that that the engine rotational speed is excessively lowered so that a sufficient acceleration force cannot be obtained. Here, the determination whether the throttle opening Th becomes a value equal or less than the predetermined value or not which is included in step S15 is performed for determining whether a rider has a clear intention of decelerating the vehicle speed.

Returning to the flow chart shown in FIG. 9, when the determination in step S15 is satisfied, the processing advances to step S16 and the counting by the shift-down restriction timer 51a is started. The shift-down restriction timer 51a is provided for restricting the shift-down during a predetermined period and a count time thereof is set to 0.5 second, for example. Then, when the counting by the shift-down restriction timer 51a is finished in step S17, the shift-down by one speed is performed. Here, the processing in steps 16 and 17 is explained in conjunction with FIG. 13. In the drawing, time (t) which satisfies the determination in step S15 is time t1 that the engine rotational speed reaches the shift-down executed Ne. When the time t1 comes, along with the start of the counting by the shift-down restriction timer 51a, the shift down restricting period is started (step S16). Then, at a point of time that the predetermined restricting period up to time t2 elapses, the shift-down by one speed is performed (step S117).

Here, when the shift-down control is performed based on only the shift-down ΔNe without using the above-mentioned shift-down restriction timer 51a, the larger the deceleration of the motorcycle, the shift-down is performed with the engine rotational speed having the smaller lowering width from the peak Ne. Accordingly, during the execution of this shift-down control, when the large deceleration is continuously applied, the shift-down is continuously performed thus excessively increasing the engine rotational speed or increasing the transmission shock along with such an increase of the engine rotational speed whereby there arises a possibility that the riding feeling is adversely affected. A portion indicated by a broken line in FIG. 13 shows a case in which when the shift-down restricting control is not performed, the shift-down is performed at the time t1 and the engine rotational speed after the shift-down is increased.

Figure 13:
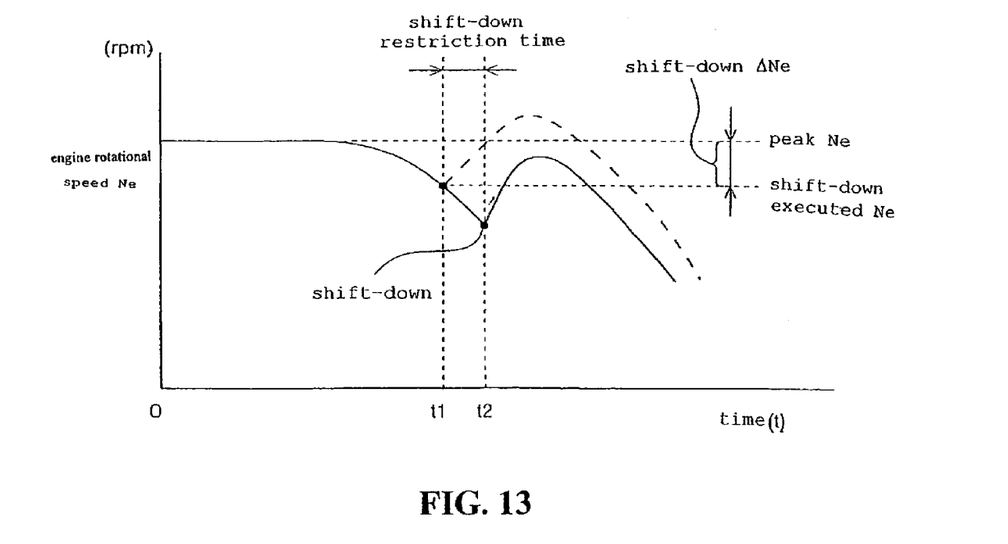
FIG. 13 is a graph showing one example of the relationship between the engine rotational speed and the shift-down period at the time of deceleration.

However, in this embodiment, the timing of the shift down is slightly delayed by providing the shift-down restriction timer 51a, the shift-down is performed as indicated by a solid line in FIG. 13 whereby it is possible to cope with the above-mentioned drawback.

As described above, according to the automatic transmission control device of the present invention, by setting the shift-down $\Delta Ne$ corresponding to the deceleration and by performing the shift-down at a point of time that the engine rotational speed is lowered from the peak Ne by the shift-down $\Delta Ne$, it is possible to perform the shift-down at the timing which takes not only the deceleration but also the engine rotational speed into consideration. Further, the engine rotational speed is configured such that the larger the deceleration, the shift-down $\Delta Ne$ becomes smaller and hence, the larger the deceleration, the shift-down can be performed with the engine rotational speed having the small lowering width from the peak Ne. That is, the shift-down can be quickly performed while maintaining the high engine rotational speed and hence, even when the reacceleration is performed immediately after the rapid deceleration, it is possible to prevent a phenomenon that the engine rotational speed is excessively lowered so that a sufficient acceleration force cannot be obtained. Further, the shift-down can be restricted during the predetermined period by providing the shift-down restriction timer. This feature helps to prevent a phenomenon that the shift-down is continuously performed at the time of the rapid deceleration thus increasing the transmission shock.

Here, the data table which indicates the relationship between the deceleration and the shift-down $\Delta Ne$, the manner of setting the shift-down restricting period and the like are not limited to the above-mentioned embodiments and various modifications are conceivable.

We claim:

1. An automatic transmission control device of a vehicle which performs a gear change operation based on a deceleration of the vehicle, the automatic transmission control device comprising:
   a deceleration detecting means for detecting the deceleration of the vehicle;
   an engine rotation speed detecting means for detecting an engine rotational speed;
   a peak value storing means for storing a peak value of the engine rotation speed during a period in which a vehicle travels with one predetermined gear step;
   a relationship map showing the relationship between the deceleration and a shift-down rotational speed; and
   a shift-down means for performing an automatic shift-down when the engine rotational speed is lowered from the peak value by a predetermined rotational speed which is obtained from the map based on the deceleration.

2. An automatic transmission control device according to claim 1, wherein the shift-down means performs the shift-down toward a low speed side by one step when the engine rotational speed is lowered from the peak value by the predetermined rotational speed.

3. An automatic transmission control device according to claim 1, wherein the predetermined rotational speed is set to a smaller value corresponding to an increase of the deceleration.

4. An automatic transmission control device according to claim 2, wherein the predetermined rotational speed is set to a smaller value corresponding to an increase of the deceleration.

5. An automatic transmission control device according to claim 1, wherein the shift-down means operates a timer which restricts the shift-down for a predetermined period when the engine rotational speed is lowered from the peak value by the predetermined rotational speed, and performs the shift-down at the end of the predetermined period.

6. An automatic transmission control device according to claim 2, wherein the means for performing the shift-down operates a timer which restricts the shift-down for a predetermined period when the engine rotational speed is lowered from the peak value by the predetermined rotational speed, and performs the shift-down at the end of the predetermined period.

7. An automatic transmission control device according to claim 3, wherein the means for performing the shift-down operates a timer which restricts the shift-down for a predetermined period when the engine rotational speed is lowered from the peak value by the predetermined rotational speed, and performs the shift-down at the end of the predetermined period.

8. An automatic transmission control device according to claim 1, wherein the automatic transmission control device is used for a motorcycle.

* * * * *